(12) United States Patent
Müller et al.

(10) Patent No.: US 11,097,584 B2
(45) Date of Patent: Aug. 24, 2021

(54) FOUR-POINT LINK AND METHOD FOR PRODUCING A FOUR-POINT LINK

(71) Applicant: ZF FRIEDRICHSHAFEN AG, Friedrichshafen (DE)

(72) Inventors: Ingolf Müller, Minfeld (DE); Manfred Bürgmann, Ravensburg (DE); Andre Stieglitz, Osnabruck (DE); Philipp Bauer, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 47 days.

(21) Appl. No.: 16/607,887

(22) PCT Filed: Mar. 27, 2018

(86) PCT No.: PCT/EP2018/057687
§ 371 (c)(1),
(2) Date: Oct. 24, 2019

(87) PCT Pub. No.: WO2018/197130
PCT Pub. Date: Nov. 1, 2018

(65) Prior Publication Data
US 2020/0070608 A1   Mar. 5, 2020

(30) Foreign Application Priority Data
Apr. 28, 2017 (DE) .......................... 102017207172.9

(51) Int. Cl.
*B60G 9/02* (2006.01)
*B60G 7/00* (2006.01)

(52) U.S. Cl.
CPC ............... *B60G 9/02* (2013.01); *B60G 7/001* (2013.01); *B60G 2206/017* (2013.01);
(Continued)

(58) Field of Classification Search
CPC .......... B60G 2206/121; B60G 2206/85; B60G 2206/71; B60G 2206/7101; B62D 29/002; B62D 29/004; B29C 44/12; B29C 44/5681
See application file for complete search history.

(56) References Cited

U.S. PATENT DOCUMENTS

| | | | | |
|---|---|---|---|---|
| 4,650,620 A | * | 3/1987 | Owen ..................... | B29C 44/12 264/137 |
| 6,324,940 B1 | * | 12/2001 | Pazdirek ............... | B29C 53/585 174/47 |

(Continued)

FOREIGN PATENT DOCUMENTS

| DE | 10 2011 079 654 | 1/2013 |
|---|---|---|
| EP | 0098739 | 1/1984 |
| GB | 2154520 | 9/1985 |

*Primary Examiner* — Paul N Dickson
*Assistant Examiner* — Matthew D Lee
(74) *Attorney, Agent, or Firm* — Cozen O'Connor

(57) ABSTRACT

A four-point link for a vehicle includes a core element and a main laminate comprising a fiber reinforced plastics composite material, which wraps around the core element. The core element comprises four load-introducing elements and a foam core, and the four load-introducing elements (4) are connected by positive engagement to the foam core (5). The four-point link has four additional windings, wherein a respective additional winding wraps around a first, second, third and fourth load-introducing element and operatively connects a respective one of the latter to the main laminate. Compressive forces can be introduced into the main laminate (3) by means of every additional winding (6).

8 Claims, 5 Drawing Sheets

(52) U.S. Cl.
CPC ............... *B60G 2206/121* (2013.01); *B60G 2206/7101* (2013.01); *B60G 2206/85* (2013.01)

(56) References Cited

U.S. PATENT DOCUMENTS

2020/0130446 A1\* 4/2020 Stieglitz ................ B60G 7/001
2020/0369105 A1\* 11/2020 Stieglitz ................ B60G 7/00

\* cited by examiner

FOUR-POINT LINK AND METHOD FOR PRODUCING A FOUR-POINT LINK

CROSS REFERENCE TO RELATED APPLICATION

This is a U.S. national stage of application No. PCT/EP2018/057687, filed on Mar. 27, 2018. Priority is claimed on German Application No.: DE102017207172.9, filed Apr. 28, 2017, the content of which is incorporated herein by reference.

FIELD OF THE INVENTION

The present invention is directed to a four-point link for a vehicle comprising a core element (2) and a main laminate (3) comprising a fiber reinforced plastics composite material, wherein the main laminate (3) is wound around the core element (2), the core element (2) comprises four load-introducing elements (4) and a foam core (5), the four load-introducing elements (4) are connected by positive engagement to the foam core (5), and to a method for producing the same.

BACKGROUND OF THE INVENTION

Four-point links are used particularly in commercial vehicles in order to guide a rigid axle in a sprung manner in a vehicle frame. The four-point link is responsible for transverse guidance and longitudinal guidance of the axle. Further, the four-point link performs the function of a stabilizer.

A four-point link formed from a fiber reinforced plastics composite material is known from DE 10 2011 079 654 A1 the content of which is hereby incorporated herein by reference. This four-point link is formed integrally or in a shell construction. This makes the four-point link very lightweight but disadvantageous with respect to suitability for large-series manufacture.

In four-point links made from fiber reinforced plastics composite material which are produced by a winding process, a fast rotation of the component part is required. Owing to the mass of the load-introducing elements and the distance between the latter and a rotational axis, high centrifugal forces occur during winding which are absorbed solely by a winding core element during the initial phase of the winding process. Accordingly, the winding process must proceed at a slower speed at the beginning of the process than at a later stage of the process when the bearing bushings have already been wrapped multiple times with the main laminate.

It is an object of the invention to further develop a four-point link made from a fiber reinforced plastics composite material for a wheel suspension of a vehicle in which large-series production is facilitated and production costs are reduced. Further, a more reliable fixing of the load-introducing elements during the production process is to be made possible.

SUMMARY OF THE INVENTION

A four-point link for a vehicle comprises a core element and a main laminate comprising a fiber reinforced plastics composite material in which the main laminate is wrapped around the core element. The core element comprises four load-introducing elements and a foam core. The four load-introducing elements are connected by positive engagement to the foam core. The four-point link has four additional windings comprising a fiber reinforced plastics composite material. A first additional winding wraps around a first load-introducing element and operatively connects the latter to the main laminate. A second additional winding wraps around a second load-introducing element and operatively connects the latter to the main laminate. A third additional winding wraps around a third load-introducing element and operatively connects the latter to the main laminate. A fourth additional winding wraps around a fourth load-introducing element and operatively connects the latter to the main laminate. Compressive forces can be introduced into the main laminate by means of every additional winding. The vehicle is preferably a commercial vehicle or a passenger vehicle.

The main laminate of the four-point link is formed from a fiber reinforced plastics composite material (FRP), e.g. a carbon fiber reinforced plastics composite material (CRP), a glass fiber reinforced plastics composite material (GRP), an aramid fiber reinforced plastics composite material (ARP) or other suitable FRP. The main laminate is preferably formed from GRP. The main laminate wraps around the core element in such a way that an operative connection is provided between the main laminate and all four of the load-introducing elements.

The core element is formed from the foam core and from the four load-introducing elements. The foam core serves to provide the inner contour of the four-point link such that the correct contour of the four-point link results during a production of the four-point link by a winding process. The foam core is formed from a foamable polymer, e.g., polystyrene (PS), polyurethane (PUR), polymethacrylimide (PMI) or other suitable polymer. The foam core is produced by a mold which is preferably formed from metal. The polymer foam is generated inside of the mold and adopts the shape predetermined by the mold.

When the four-point link is used in a vehicle, the load-introducing elements serve to support the four-point link at a vehicle body and to operatively connect the four-point link to the vehicle body. Every load-introducing element has a receptacle for a bearing. Every receptacle of the load-introducing elements is suitable for receiving a bearing, e.g., a rubber-metal bearing or an elastomeric bearing (molecular bearing). An operative connection is produced between the load-introducing elements and the bearings by this receptacle. If a load event should occur when using the four-point link in a vehicle, forces are introduced via at least one bearing into the relevant load-introducing element or load-introducing elements which convey these forces to the main laminate. Accordingly, every load-introducing element forms a bearing region of the four-point link and delimits the four-point link toward one side.

The four load-introducing elements are preferably identically formed, but can also be different from one another. Every load-introducing element is a geometrical extruded body having an outer lateral surface and two top surfaces, and every load-introducing element is preferably formed symmetrical to a central plane. This central plane is parallel to and at an equal distance from the two top surfaces. Every load-introducing element has a specific shape which makes it possible to integrate the load-introducing elements into the foam core. Every load-introducing element can have, in cross section, the shape of a triangle with superimposed circle or the shape of a teardrop, for example. Every load-introducing element can have, for example, an anchoring region which is enclosed by the foam core during the production process. During the production of the core element, the four load-introducing elements are inserted into the mold and arranged therein such that the load-introducing elements are integrated in the foam core, for example, by their respective anchoring region, during the foaming of the foam core so that the core element is formed. However, the receptacle of every load-introducing element always remains free of material. The load-introducing elements cannot be detached from the foam core in a nondestructive manner. Each of the four load-introducing elements is therefore connected to the foam core by positive engagement.

The four-point link has the four additional windings of FRP, e.g., the additional windings can be formed from GRP, CRP, ARP or from another suitable FRP. Every additional winding wraps around its corresponding load-introducing element and operatively connects the latter, in addition, to the main laminate. The additional windings serve to convey the compressive forces occurring during a load event from the load-introducing element to the main laminate when the four-point link is used in a vehicle.

By the operative connection between the main laminate and the four load-introducing elements, it is possible during a load event, when the four-point link is used in a vehicle, to transmit occurring tensile longitudinal forces to the main laminate by positive engagement, to transmit occurring lateral forces to the main laminate by shear and possibly by positive engagement, and to transmit vertical forces to the main laminate by positive engagement. It is not certain that a transmission of compressive forces occurring, for example, during a "braking" load event is possible by this operative connection. However, these compressive forces can be transmitted from the respective load-introducing elements to the main laminate by the additional windings by shear and tensile positive engagement.

The use of additional windings is advantageous in that, during the production process in which the main laminate of the four-point link is produced by a winding process, the same robot can be used to produce the additional windings. Further, it is advantageous that the four-point link comprising FRP has a smaller mass than a conventional four-point link comprising a metal material. Further, producing the four-point link by a winding process is inexpensive and time-efficient. All of the forces occurring during a load event can be transmitted to the main laminate and absorbed by the latter in a simple and reliable manner.

According to an embodiment, at least one of the four load-introducing elements has at least one guide projection for guiding the associated additional winding. It will be appreciated that the at least one load-introducing element can have two guide projections or a plurality of guide projections. Further, more than one load-introducing element can have at least one guide projection or a plurality of guide projections. A guide projection serves to guide the winding strands of the respective additional winding during the production process so that this additional winding is accurately positioned. The at least one guide projection delimits the load-introducing element toward one side.

The at least one guide projection is arranged at one of the top surfaces of the load-introducing element, where it forms a radial projection. "Radial" refers to a central axis of the receptacle of the load-introducing element. If the at least one load-introducing element has two guide projections, one of the guide projections is arranged at one top surface of the at least one load-introducing element and the other guide projection is arranged at the other top surface of the at least one load-introducing element. The at least one guide projection is preferably formed continuously, i.e., uninterruptedly so as to be free of material. Alternatively, the at least one guide projection can be formed of a plurality of portions between which material-free interruptions are arranged.

According to a further embodiment, each of the four load-introducing elements has two wrap regions, and a winding length of the respective additional winding corresponds to the formation of the wrap regions. A wrap region is that region of a load-introducing element that directly contacts the additional winding. "Directly" means that contact is made without intermediate components.

Every wrap region is formed in such a way that the additional winding wraps around the wrap region radially. The additional winding preferably wraps around every wrap region continuously. The winding length of the additional winding is longer or shorter depending on the formation of the wrap regions. The winding length of the additional winding is determined by the circumference of the wrap region.

For example, if a wrap region has a circular or elliptical cross section, the winding length is determined by the circumference of the circle or ellipse.

According to a further embodiment, each of the four load-introducing elements has an anchoring region by which every load-introducing element is connected to the foam core by positive engagement. The anchoring region is enclosed by the polymer foam of the foam core during the production process for producing the core element so that, after the foam core hardens, a positive engagement connection is formed between the foam core and the four load-introducing elements. The anchoring region can be triangular in cross section, for example, but alternatively can also have another suitable shape.

According to a further embodiment, the foam core is formed from a polymer foam. This polymer foam can be formed, e.g., from PU, PS or PMI.

According to a further embodiment, the additional windings can be formed from a GRP or a CRP. The additional windings are preferably formed from the same material as the main laminate.

According to a further embodiment, the load-introducing elements are formed from a metal material or from a fiber reinforced plastics composite material. For example, the load-introducing elements can be formed from steel, aluminum, or SMC (sheet molding compound). The load-introducing elements are preferably formed from aluminum or from SMC so that they have a smaller mass than when formed from steel. The load-introducing elements can be produced in series production through a casting process, an extrusion process or a cutting process. The production of the load-introducing elements can advantageously be modularized in this way.

In a method for producing a four-point link for a vehicle which has been described in the foregoing, the four load-introducing elements are first provided in a mold for the foam core. The foam core is produced in the mold such that the four load-introducing elements are integrated in the foam core by positive engagement. The respective anchoring regions of the load-introducing elements are enclosed by the polymer foam of the foam core so as to produce the positive engagement. This positive engagement connection makes it possible to carry out the subsequent winding process at high speed from the outset, since the occurring centrifugal forces need no longer be absorbed only by the foam core. Accordingly, the load-introducing elements are reliably connected and fixed to the foam core.

Every load-introducing element and the foam core are single wrapped with the main laminate so as to allow a transmission of force between the load-introducing elements and the main laminate. Accordingly, there is an operative connection between the load-introducing elements and the main laminate. By this operative connection, it is possible during a load event, when the four-point link is used in a vehicle, to transmit occurring tensile longitudinal forces to the main laminate by positive engagement, to transmit occurring lateral forces to the main laminate by shear and possibly by positive engagement, and to transmit vertical forces to the main laminate by positive engagement.

Subsequently, the first additional winding wraps around the first load-introducing element such that an additional operative connection to the main laminate results. Further, the second additional winding wraps around the second load-introducing element so that an additional operative connection to the main laminate results. Further, the third additional winding wraps around the third load-introducing element such that an additional operative connection to the main laminate results. Further, the fourth additional winding wraps around the fourth load-introducing element such that an additional operative connection to the main laminate results. The additional windings are produced by the same robot that carries out the winding process for the main laminate. By the additional windings, compressive forces can be additionally transmitted from the respective load-introducing elements to the main laminate during the load event by shear and tensile positive engagement. Subsequently, the finished four-point link is hardened.

BRIEF DESCRIPTION OF THE DRAWINGS

Various embodiments and details of the invention will be described more fully with reference to the drawings in which.

DETAILED DESCRIPTION OF THE PRESENTLY PREFERRED EMBODIMENTS

Figure 1A:
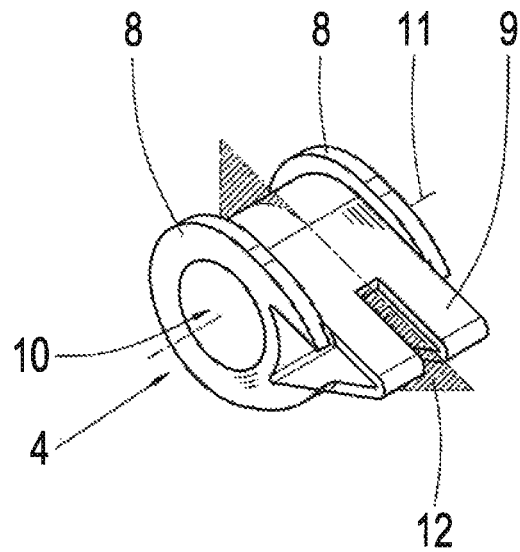
FIG. 1A a schematic diagram of a load-introducing element according to the invention.

FIGS. 1A and B show a schematic diagram of a load-introducing element 4 in two views according to an embodiment example. It will be clearly discerned that the load-introducing element 4 is a geometrical extruded body with two top surfaces and an outer lateral surface. This extruded body is symmetrical to a central plane 12. The two top surfaces are at an equal distance from this central plane 12 and parallel to it. Load-introducing element 4 has a receptacle 10 for a bearing, for example, an elastomeric bearing. This receptacle 10 has a central axis 11. This central axis 11 is perpendicular to central plane 12.

Load-introducing element 4 has an anchoring region 9 and two wrap regions 8. Anchoring region 9 is triangular in cross section. Wrap regions 8 are elliptical in cross section. This anchoring region 9 is enclosed by a polymer foam of a foam core during a production process for producing a four-point link. Accordingly, a positive engagement connection can be provided between load-introducing element 4 and the foam core. This is shown in FIGS. 2 and 3.

Every wrap region 8 serves to be wrapped by an additional winding 6. The circumference of the wrap regions 8 directly corresponds to a winding length of the additional winding. This is shown in more detail in FIG. 3. The load-introducing element 4 shown here is formed from aluminum and is produced through an extrusion process. Alternatively, load-introducing element 4 can be formed from an FRP. A four-point link has four of these load-introducing elements 4. These load-introducing elements 4 of the four-point link can all be formed identically.

Figure 1B:
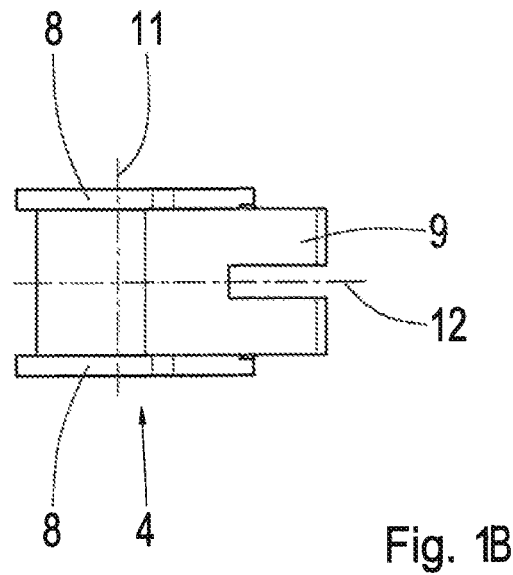
FIG. 1B is a top view of FIG. 1A.
Figure 2:
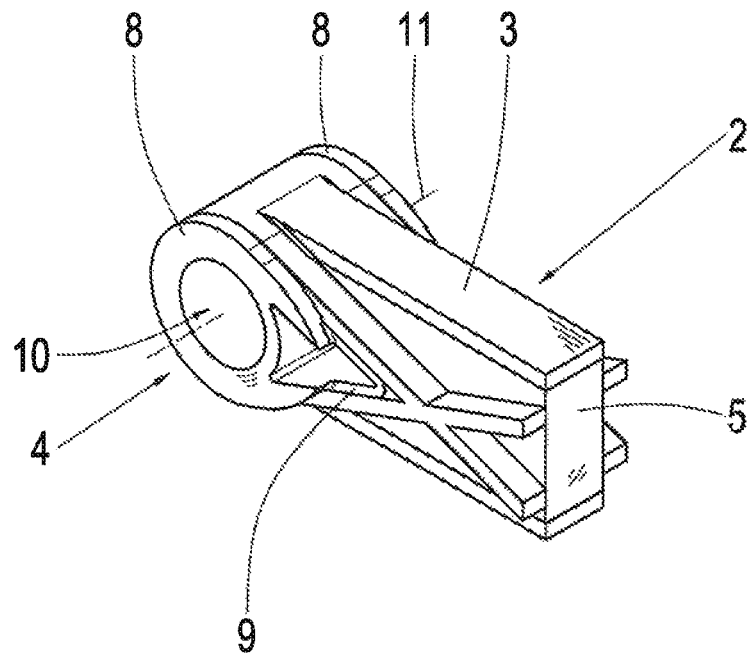
FIG. 2 a schematic diagram of the load-introducing element from FIG. 1 connected to a main laminate and a foam core.
Figure 3:
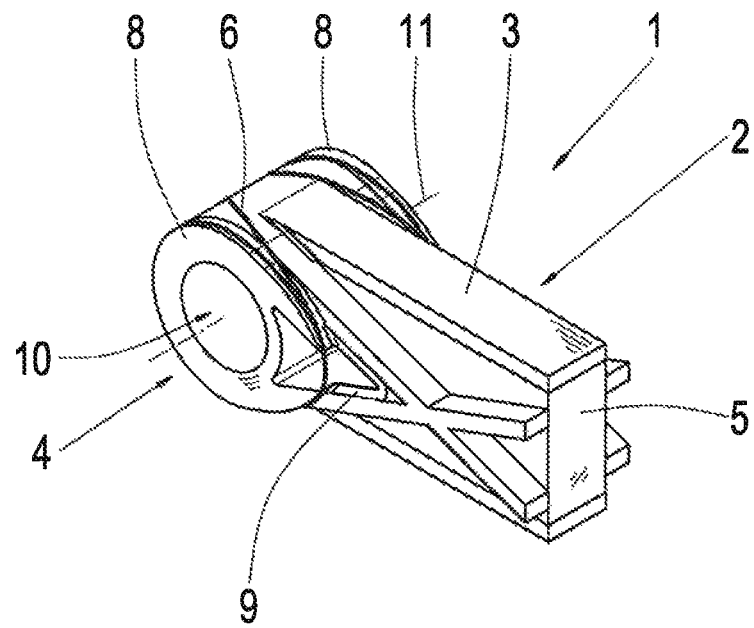
FIG. 3 a schematic diagram of the load-introducing element, the main laminate and the foam core from FIG. 2 with an additional winding.

FIG. 2 shows a schematic diagram of load-introducing element 4 from FIG. 1 which is connected to a main laminate 3 and to a foam core 5 according to an embodiment example. It will be clearly discerned that load-introducing element 4 is integrated in the foam core 5 by the anchoring region 9 of load-introducing element 4. Foam core 5 surrounds anchoring region 9. Foam core 5 is connected by positive engagement to four identical load-introducing elements 4 and accordingly forms the core element 2. Only a section of core element 2 is shown. Foam core 5 is formed from a polymer foam.

Main laminate 3 wraps around foam core 5 and load-introducing element 4. However, the two wrap regions 8 of load-introducing element 4 are free of material and the main laminate 3 does not wrap around these two wrap regions 8.

The arrangement shown here without the additional winding is able during a load event, when the four-point link is used in a vehicle, to transmit tensile longitudinal forces from load-introducing element 4 to main laminate 3 via positive engagement, to transmit lateral forces from load-introducing element 4 to main laminate 3 via shear and possibly via positive engagement, and to transmit vertical forces from load-introducing element 4 to main laminate 3 via positive engagement.

FIG. 3 shows a schematic view of load-introducing element 4, main laminate 3 and foam core 5 from FIG. 2 with an additional winding 6 according to an embodiment example. In addition to the configuration shown in FIG. 2, an additional winding 6 is operatively connected to core element 2 and main laminate 3.

Additional winding 6 wraps around the two wrap regions 8 of the load-introducing element 4 radially. Further, additional winding 6 likewise winds radially around main laminate 3 in a partial area. An additional operative connection between load-introducing element 4 and main laminate 3 results from the additional winding 6. Additional winding 6 wraps around the two wrap regions 8 continuously, i.e., without interruption. In a four-point link 1, only a section of which is shown, each of the four load-introducing elements 4 is wrapped by additional winding 6. The winding length of the additional winding 6 is determined by the circumference of the two wrap regions 8.

Compressive forces occurring during a load event, e.g., a braking event, can be reliably transmitted into main laminate 3 by a shear and tensile positive engagement as a result of this additional winding 6.

Additional winding 6 is preferably formed from the same material as main laminate 3. For example, main laminate 3 can be formed from GRP. Additional winding 6 is then also formed from GRP. Additional winding 6 is produced by the same robot as that with which main laminate 3 has already been produced. This allows an economical production.

Figure 4A:
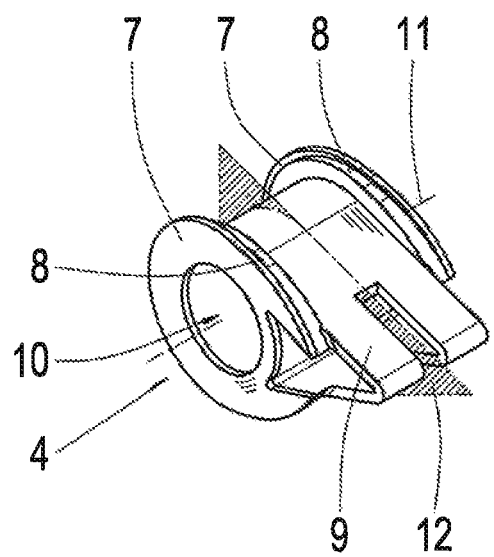
FIG. 4A a schematic diagram of a load-introducing element.

FIGS. 4A and B show a schematic diagram of a load-introducing element 4 in two views according to a further embodiment example. The depicted load-introducing element 4 is symmetrical to a central plane 12. It will be clearly discerned that load-introducing element 4 is a geometrical extruded body with two top surfaces and an outer lateral surface. This extruded body is symmetrical to this central plane 12. The two top surfaces are at an equal distance from this central plane 12 and are parallel to it. Load-introducing element 4 further has a central axis 11 which is perpendicular to central plane 12.

Figure 5:
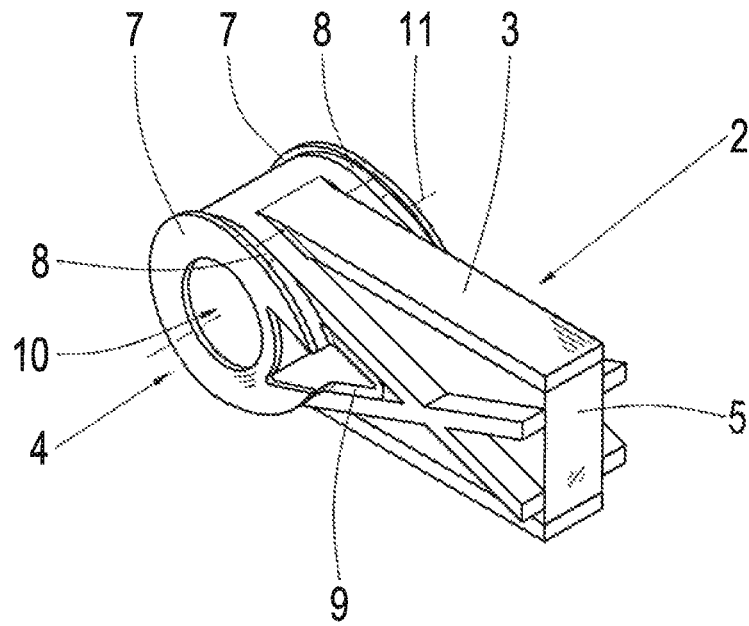
FIG. 5 a schematic diagram of the load-introducing element from FIG. 4 connected to a main laminate and a foam core.
Figure 6:
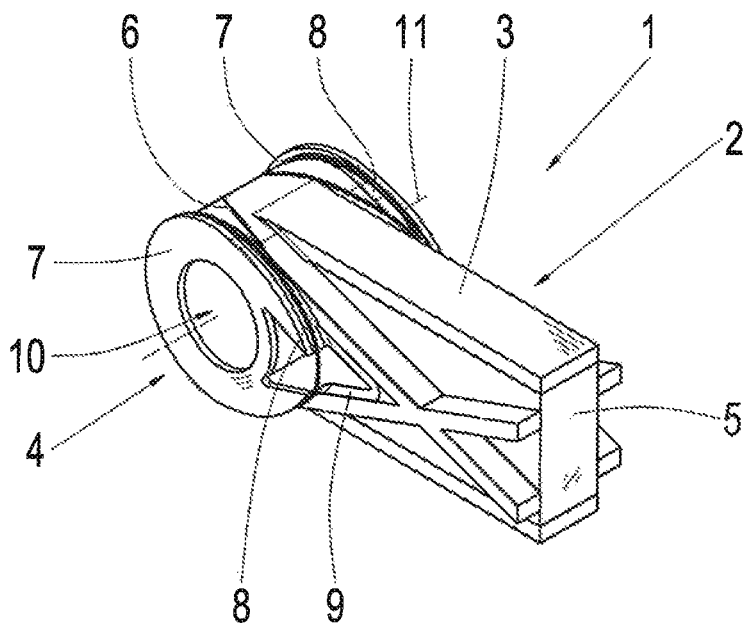
FIG. 6 a schematic diagram of the load-introducing element, the main laminate and the foam core from FIG. 5 with an additional winding.

Load-introducing element 4 has a receptacle 10 for a bearing. By this receptacle 10, load-introducing element 4 can be connected to a bearing, for example, an elastomeric bearing. Load-introducing element 4 further has two wrap regions 8, an anchoring region 9 and two guide projections 7. Anchoring region 9 serves to produce a positive engagement connection to a foam core of a four-point link which is shown in FIGS. 5 and 6. This positive engagement connection is the same as that already described referring to FIGS. 2 and 3. Anchoring region 9 has a triangular cross section.

The two wrap regions 8 have an elliptical cross section. The two guide projections 7 are connected to the two wrap regions 8. A first guide projection 7 is connected to a first wrap region 8. A second guide projection 7 is connected to a second wrap region 8. First guide projection 7 is arranged at a first top surface of load-introducing element 4. Second guide projection 7 is arranged at a second top surface of load-introducing element 4. The two guide projections 7 are radial to central axis 11 of load-introducing element 4. The two guide projections 7 serve to guide and position the additional winding which is shown in FIG. 6.

Figure 4B:
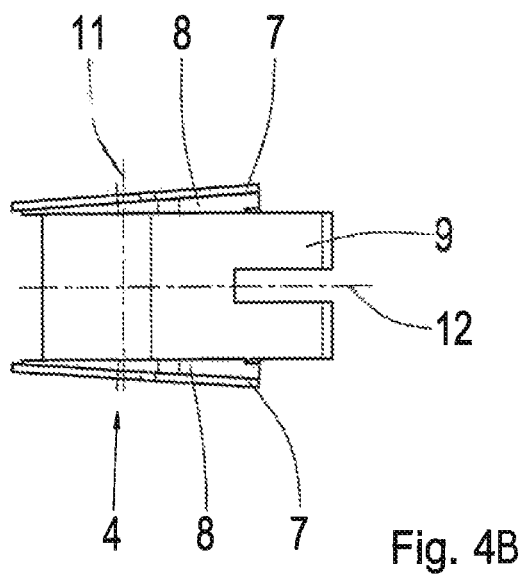
FIG. 4B is a top view of FIG. 4A.

FIG. 5 shows a schematic diagram of load-introducing element 4 from FIG. 4 which is connected to a main laminate 3 and a foam core 5 according to a further embodiment example. It will be clearly discerned that load-introducing element 4 is integrated in foam core 5 by the anchoring region 9 of load-introducing element 4. Load-introducing element 4 is connected to foam core 5 by positive engagement. Foam core 5 surrounds anchoring region 9. Foam core 5 is formed from a polymer foam. Foam core 5 is connected by positive engagement to four identical load-introducing elements 4 and accordingly forms core element 2. In this case, only a section of core element 2 is shown. Core element 2, and therefore load-introducing element 4 and foam core 5, are wrapped by main laminate 3 in a partial area. Main laminate 3 does not wrap around wrap regions 8 and guide projections 7 of load-introducing element 4. The latter are free of material.

The load-introducing element is preferably formed from aluminum or FRP. Main laminate 3 is formed from FRP, preferably GRP.

The arrangement shown here without additional winding is able during a load event, when the four-point link is used in a vehicle, to transmit tensile longitudinal forces from load-introducing elements 4 to main laminate 3 via positive engagement, to transmit lateral forces from load-introducing elements 4 to main laminate 3 via shear and possibly via positive engagement, and to transmit vertical forces from load-introducing elements 4 to main laminate 3 via positive engagement.

FIG. 6 shows a schematic diagram of load-introducing element 4, main laminate 3 and foam core 5 from FIG. 5 with an additional winding 6 according to an embodiment example. A section from the four-point link 1 which has four load-introducing elements 4 is shown. In this case, beyond the arrangement in FIG. 5, an additional winding 6 is wrapped around load-introducing element 4 as well as around main laminate 3.

Additional winding 6 wraps around the two wrap regions 8 of load-introducing element 4 radially. Further, additional winding 6 wraps around main laminate 3 in a partial area, likewise radially. An additional operative connection results between load-introducing element 4 and main laminate 3 because of additional winding 6. Additional winding 6 wraps around the two wrap regions 8 continuously, i.e., without interruption. The two guide projections 7 serve to position additional winding 6 accurately at wrap regions 8 so that slippage of additional winding 6 is impossible. In a four-point link 1, only a section of which is shown in this instance, each of the four load-introducing elements 4 is wrapped by an additional winding 6. The winding length of additional winding 6 is determined by the circumference of the two wrap regions 8.

As a result of additional winding 6, an additional operative connection is formed between load-introducing element 4 and main laminate 3. During the load event described referring to FIG. 5, which is brought about, for example, by braking, compressive forces can be transmitted from load-introducing element 4 into main laminate 3 by the additional winding 6 through shear and tensile positive engagement.

Additional winding 6 is preferably formed from the same material as main laminate 3, for example, from GRP or CRP. Load-introducing element 4 is preferably produced by an extrusion process. Additional winding 6 is produced by the same robot as that for the windings of main laminate 3. This makes possible an economical production.

Figure 7A:
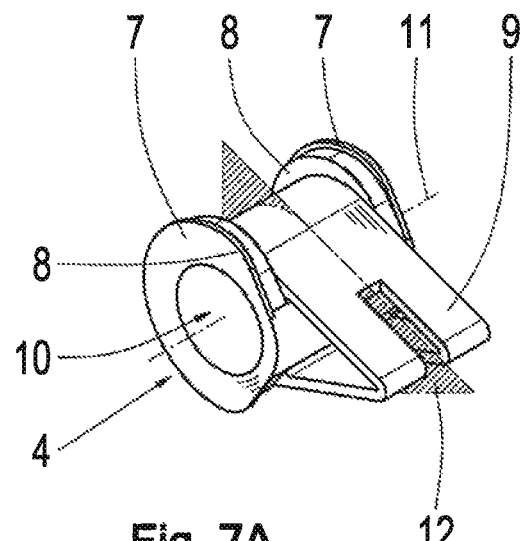
FIG. 7A a schematic diagram of a load-introducing element.

FIGS. 7A and B show a schematic diagram of a load-introducing element 4 in two views according to a further embodiment example. The depicted load-introducing element 4 is symmetrical to a central plane 12. It will be clearly discerned that load-introducing element 4 is a geometrical extruded body with two top surfaces and an outer lateral surface. This extruded body is symmetrical to this central plane 12. The two top surfaces are at an equal distance from this central plane 12 and are parallel to it. Further, load-introducing element 4 has a central axis 11 which is perpendicular to central plane 12.

Load-introducing element 4 has a receptacle 10 for a bearing, for example, an elastomeric bearing. Receptacle 10 is cylindrically shaped and has a central axis 11. This central axis 11 is perpendicular to central plane 12.

Figure 8:
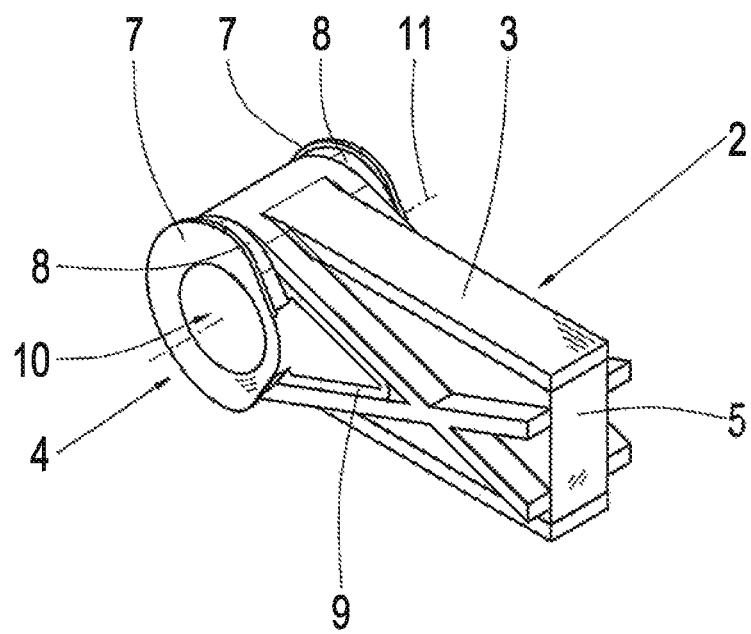
FIG. 8 a schematic diagram of the load-introducing element from FIG. 7 connected to a main laminate and a foam core.
Figure 9:
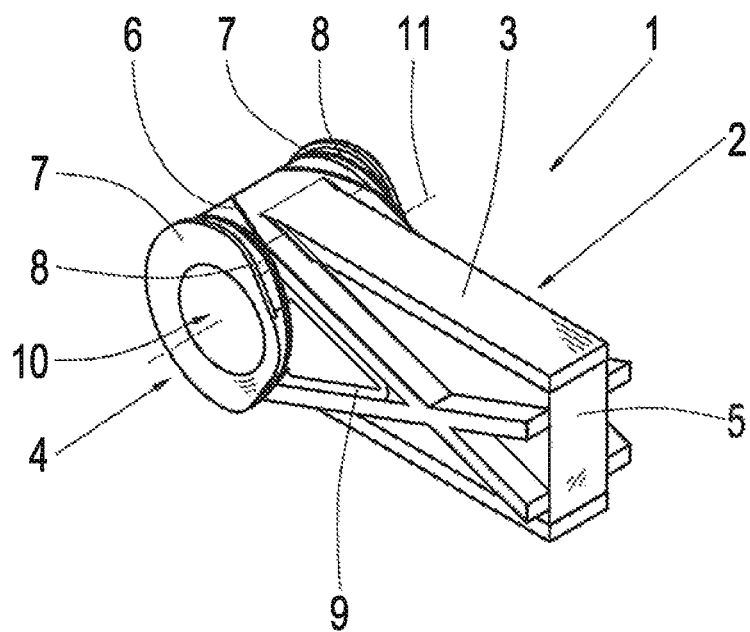
FIG. 9 a schematic diagram of the load-introducing element, the main laminate and the foam core from FIG. 8 with an additional winding.

Load-introducing element 4 has an anchoring region 9, two wrap regions 8 and two guide projections 7. Anchoring region 9 has a triangular cross section. Anchoring region 9 serves to produce a positive engagement connection between load-introducing element 4 and a foam core, which is shown in FIGS. 8 and 9. This positive engagement connection is the same as that already shown referring to FIGS. 2 and 3 and FIGS. 5 and 6.

The two wrap regions 8 have an elliptical cross-sectional area. A first guide projection 7 is connected to a first wrap region 8. A second guide projection 7 is connected to a second wrap region 8. First guide projection 7 is arranged at the first top surface, second guide projection 7 is arranged at the second top surface. The two guide projections 7 serve to guide and position an additional winding which is shown in FIG. 9. The two wrap regions 8 serve to be wrapped by additional winding 6. The load-introducing element shown here is preferably produced from aluminum or an FRP by an extrusion process.

Figure 7B:
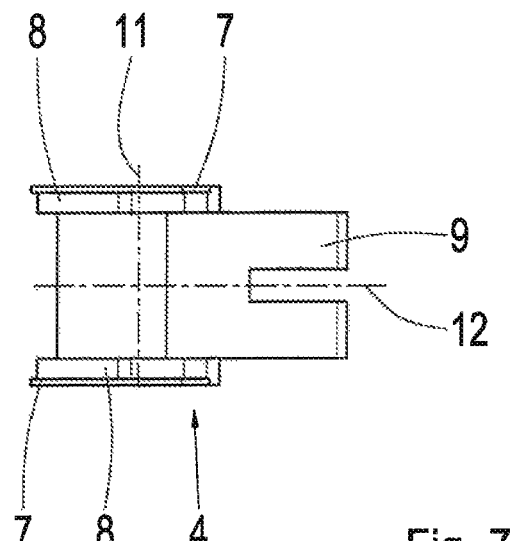
FIG. 7B is a top view of FIG. 7A.

FIG. 8 shows a schematic diagram of load-introducing element 4 from FIG. 7 which is connected to a main laminate 3 and a foam core 5 according to a further embodiment example. It will be clearly discerned that load-introducing element 4 is integrated in the foam core 5 anchoring region 9 of load-introducing element 4. Load-introducing element 4 is connected to foam core 5 by positive engagement. Foam core 5 surrounds anchoring region 9. Foam core 5 is formed from a polymer foam. Foam core 5 is connected by positive engagement to four identical load-introducing elements 4 and accordingly forms core element 2. Only a section of core element 2 is shown.

Core element 2 and accordingly load-introducing element 4 and foam core 5 are wrapped by main laminate 3 in a partial region. Main laminate 3 does not wrap around wrap regions 8 and guide projections 7 of load-introducing element 4. The latter are still free of material. Main laminate 3 is preferably formed from FRP, for example, from GRP or CRP.

The arrangement shown here without additional winding is able during a load event, when the four-point link is used in a vehicle, to transmit tensile longitudinal forces from load-introducing elements 4 to main laminate 3 via positive engagement, to transmit lateral forces from load-introducing elements 4 to main laminate 3 via shear and possibly via positive engagement, and to transmit vertical forces from load-introducing elements 4 to main laminate 3 via positive engagement.

FIG. 9 shows a schematic diagram of load-introducing element 4, main laminate 3 and foam core 5 from FIG. 8 with an additional winding 6 according to an embodiment example. In this case, beyond the arrangement in FIG. 8, the additional winding 6 is shown. Additional winding 6 is preferably formed from the same material as main laminate 3, for example, GRP.

Additional winding 6 wraps around the two wrap regions 8 of load-introducing element 4 radially. Further, additional winding 6 wraps around main laminate 3 in a partial area, likewise radially. An additional operative connection results between load-introducing element 4 and main laminate 3 because of additional winding 6. Additional winding 6 wraps around the two wrap regions 8 continuously, i.e., without interruption. The two guide projections 7 serve to position additional winding 6 accurately at wrap regions 8 so that a slippage of additional winding 6 is impossible. In a four-point link 1, only a section of which is shown in this instance, each of the four load-introducing elements 4 is wrapped by an additional winding 6. The winding length of additional winding 6 is determined by the circumference of the two wrap regions 8. The winding length of additional winding 6 shown here is appreciably shorter than the winding length of the additional winding that is shown in FIG. 6 or in FIG. 3.

As a result of additional winding 6, an additional operative connection is formed between load-introducing element 4 and main laminate 3. During the load event described referring to FIG. 8, which is brought about, for example, by braking, compressive forces can be transmitted from load-introducing element 4 into main laminate 3 by additional winding 6 through shear and tensile positive engagement. Additional winding 6 is produced by the same robot as that for the windings of main laminate 3. This makes possible an economical production.

Figure 10:
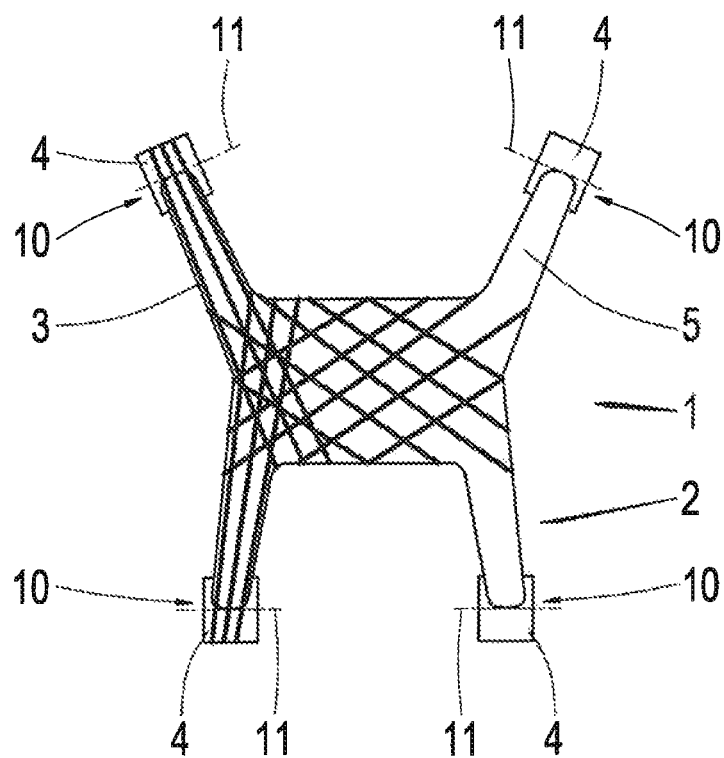
FIG. 10 a schematic diagram of a four-point link without additional winding.

FIG. 10 shows a schematic diagram of a four-point link 1 without additional winding not according to the present invention. The four-point link 1 is shown here only for purposes of an overview. It will be clearly discerned that four-point link 1 has four load-introducing elements 4 which have, in each instance, a receptacle 10 for a bearing, for example, for an elastomeric bearing. Every receptacle 10 has a central axis 11. In this case, it is shown that main laminate 3 wraps around foam core 5 and the four load-introducing elements 4. The four-point link 1 shown here has no additional winding. Accordingly, during a load event, the four-point link 1 shown here can only transmit tensile longitudinal forces from load-introducing elements 4 to main laminate 3 via positive engagement, lateral forces from load-introducing elements 4 to main laminate 3 via shear and possibly via positive engagement, and vertical forces from load-introducing elements 4 to main laminate 3 via positive engagement. However, with this construction principle, compressive forces cannot be reliably absorbed and transmitted into main laminate 3. Accordingly, a reliable response to a load event cannot be ensured.

The embodiment examples shown herein are selected to be exemplary only. For example, the load-introducing element or load-introducing elements can be shaped differently than shown herein. For example, the anchoring region can have a more specific shape so as to improve the positive engagement between the foam core and the load-introducing elements.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A four-point link for a vehicle, comprising:
   a core element comprising four load introducing elements and a foam core, and said four load introducing elements connected by positive engagement to said foam core;
   a main laminate comprising a fiber reinforced plastic composite material, said main laminate wound around said core element,
   said four-point link further comprising four additional windings comprising a fiber reinforced plastic composite material, wherein a first additional winding of said four additional windings wraps around a first load-introducing element of said four load-introducing elements and operatively connects said first load-introducing element to said main laminate, a second additional winding wraps around a second load-introducing element of said four load-introducing element and operatively connects said second load-introducing element to said main laminate, a third additional winding wraps around a third load-introducing element of said four load-introducing elements and operatively connects said third load-introducing element to said main laminate, a fourth additional winding wraps around a fourth load-introducing element of said four load-introducing elements and operatively connects said fourth load-introducing element to said main laminate, and wherein compressive forces can be introduced into said main laminate by each of said additional winding.

2. The four-point link according to claim 1, wherein at least one of said four load-introducing elements has at least one guide projection for guiding an associated additional winding.

3. The four-point link according to claim 1, wherein each of said four load-introducing elements has two wrap regions (8), and wherein a winding length of a respective additional winding corresponds to the formation of said wrap regions.

4. The four-point link according to claim 1, wherein each of said four load-introducing elements has an anchoring region for connecting every load-introducing element to said foam core by positive engagement.

5. The four-point link according to claim 1, wherein said foam core is formed from a polymer foam.

6. The four-point link according to claim 1, wherein said additional windings are formed from one of a glass fiber reinforced plastics composite material or a carbon fiber reinforced plastics composite material.

7. The four-point link according to claim 1, wherein said load-introducing elements are formed from one of a metal material and a fiber reinforced plastics composite material.

8. A method for producing a four-point link for a vehicle comprising:
   providing four load-introducing elements in a mold for a foam core;
   producing the foam core in the mold such that the four load-introducing elements are integrated in the foam core by positive engagement;
   singly wrapping every load-introducing element and the foam core with a main laminate so as to enable a transmission of force between the load-introducing elements and the main laminate;
   wrapping a first additional winding around the first load-introducing element so as to result in an additional operative connection to the main laminate;
   wrapping a second additional winding around the second load-introducing element so as to result in an additional operative connection to the main laminate;
   wrapping a third additional winding around the third load-introducing element so as to result in an additional operative connection to the main laminate;
   wrapping a fourth additional winding around the fourth load-introducing element so as to result in an additional operative connection to the main laminate; and hardening the four-point link.

* * * * *